United States Patent
Watanabe et al.

(10) Patent No.: US 12,448,546 B2
(45) Date of Patent: Oct. 21, 2025

(54) ASSEMBLY FOR FUEL CELL, AND LAMINATED BODY

(71) Applicants: TOYOBO CO., LTD., Osaka (JP); TOYOTA JIDOSHA KABUSHIKI KAISHA, Toyota (JP); TOAGOSEI CO., LTD., Toyota (JP)

(72) Inventors: Shinya Watanabe, Tsuruga (JP); Ai Koganemaru, Otsu (JP); Hisao Okumura, Tokyo (JP); Tomoya Sugiki, Tokyo (JP); Takahiro Ito, Nagoya (JP); Makoto Imahori, Nagoya (JP); Yusuke Shimmyo, Toyota (JP); Kenji Sato, Toyota (JP); Takuya Kurihara, Toyota (JP)

(73) Assignees: TOYOBA CO., LTD., Osaka (JP); TOAGOSEI CO., LTD., Tokyo (JP); TOYOTA JIDOSHA KABUSHIKI KAISHA, Tokyo (JP)

( * ) Notice: Subject to any disclaimer, the term of this patent is extended or adjusted under 35 U.S.C. 154(b) by 665 days.

(21) Appl. No.: 17/640,971

(22) PCT Filed: Sep. 10, 2020

(86) PCT No.: PCT/JP2020/034328
§ 371 (c)(1),
(2) Date: Mar. 7, 2022

(87) PCT Pub. No.: WO2021/060000
PCT Pub. Date: Apr. 1, 2021

(65) Prior Publication Data
US 2022/0340781 A1    Oct. 27, 2022

(30) Foreign Application Priority Data
Sep. 26, 2019   (JP) .................................. 2019-176238

(51) Int. Cl.
| | |
|---|---|
| *C09J 7/10* | (2018.01) |
| *B32B 15/08* | (2006.01) |
| *C09J 123/26* | (2006.01) |
| *H01M 8/0228* | (2016.01) |
| *H01M 8/0284* | (2016.01) |

(52) U.S. Cl.
CPC ............... *C09J 7/10* (2018.01); *B32B 15/08* (2013.01); *C09J 123/26* (2013.01); *H01M 8/0228* (2013.01); *H01M 8/0284* (2013.01); *B32B 2250/02* (2013.01); *B32B 2457/18* (2013.01); *C09J 2203/33* (2013.01); *C09J 2301/416* (2020.08); *C09J 2423/10* (2013.01); *C09J 2425/00* (2013.01)

(58) Field of Classification Search
None
See application file for complete search history.

(56) References Cited

U.S. PATENT DOCUMENTS

| | | |
|---|---|---|
| 2017/0096586 A1 | 4/2017 | Sakata et al. |
| 2017/0365825 A1 | 12/2017 | Ijuin et al. |
| 2019/0001634 A1 | 1/2019 | Takei et al. |
| 2019/0031928 A1* | 1/2019 | Iizuka ..................... B32B 37/12 |

FOREIGN PATENT DOCUMENTS

| | | |
|---|---|---|
| EP | 1197504 A1 | 4/2002 |
| JP | 2007-188718 A | 7/2007 |
| JP | 2011-213767 A | 10/2011 |
| JP | 2016-162622 A | 9/2016 |
| JP | 2017-036351 A | 2/2017 |
| JP | 2017-036354 A | 2/2017 |
| JP | 2018-147700 A | 9/2018 |
| WO | WO 2001/004170 A1 | 1/2001 |
| WO | WO 2014/112506 A1 | 7/2014 |
| WO | WO 2015/190411 A1 | 12/2015 |
| WO | WO 2018/186463 A1 | 10/2018 |
| WO | WO 2018-221037 A1 | 12/2018 |
| WO | WO 2019/069869 A1 | 4/2019 |
| WO | WO 2019/069896 A1 | 4/2019 |

OTHER PUBLICATIONS

Japan Patent Office, Submission of Information in Japanese Patent Application No. 2021-548787 (Sep. 13, 2022).
Japanese Patent Office, International Search Report in International Patent Application No. PCT/JP2020/034328 (Oct. 13, 2020).
Korean Intellectual Property Office, Office Action in Korean Patent Application No. 10-2022-7008395 (Oct. 16, 2023).
China National Intellectual Property Administration, First Office Action in Chinese Patent Application No. 202080067157.X (Apr. 19, 2023).

\* cited by examiner

*Primary Examiner* — Sheeba Ahmed
(74) *Attorney, Agent, or Firm* — Leydig, Voit & Mayer, Ltd.

(57) ABSTRACT

The invention provides an assembly for fuel cell which has an excellent adhesive force in the presence of hot water, and a laminated body which is used for the assembly for fuel cell. The assembly for fuel cell comprises an adhesive resin layer containing a polyolefin having at least one group selected from the group consisting of an acidic group and an acid anhydride group and having an acid value of 0.01 mgKOH/g to 6.5 mgKOH/g; and two or more members bonded with the adhesive resin layer interposed therebetween, wherein at least one of the members is a metal member having a ratio of a dipole term in surface free energy of 0.01% to 5.0%.

20 Claims, No Drawings

ASSEMBLY FOR FUEL CELL, AND LAMINATED BODY

TECHNICAL FIELD

The present disclosure relates to an assembly for fuel cell, and a laminated body.

BACKGROUND ART

A hot-melt type adhesive composition is processed into a film shape or a sheet shape, and the processed product is used as an adhesive film or sheet laminated on the surface of a member in various fields such as an electric field, an automobile field, and other industrial fields. In order to bond a metal member made of iron, aluminum, titanium, other metals, and alloys thereof and the like, which are used in these fields, the use of a hot-melt type composition containing an olefinic thermoplastic resin modified with an acid (hereinafter, referred to as "acid-modified polyolefin") as a main component has been known to provide an assembly having relatively good adhesive strength.

For example, Patent Document 1 discloses an adhesive seal member using an adhesive composition containing a specific acid-modified polyolefin, a thermoplastic elastomer not modified with an acid, and a silane coupling agent having an epoxy group. This has an adhesive force provided by a chemical bond between the silane coupling agent and a hydroxyl group on a metal surface, and an assembly using the seal member has excellent water resistance.

Patent Document 2 relates to a method for producing an assembly of a metal member and a thermoplastic resin member by thermal welding using a polyolefin under a specific condition, and discloses that the film thickness of the polyolefin is 0.1 to 9 mm when the metal member is subjected to a surface treatment such as a chromate treatment, and the film thickness of the polyolefin is 0.2 to 9 mm when the metal member is not subjected to the surface treatment.

Patent Document 3 discloses a hot-melt adhesive resin film in which a first adhesive layer, a first intermediate layer, a substrate layer having heat resistance, a second intermediate layer, and a second adhesive layer are laminated in this order, and the first adhesive layer and the second adhesive layer contain an acid-modified polyolefin resin.

Patent Document 4 discloses an adhesive composition containing a specific modified polyolefin (A), a glycidyl amine-type epoxy resin (B1), a glycidyl ether-type epoxy resin (B2), and an organic solvent (C).

PRIOR ART DOCUMENTS

Patent Documents

Patent Document 1: JP-A-2011-213767
Patent Document 2: International Publication No. 2014/112506
Patent Document 3: JP-A-2017-36354
Patent Document 4: International Publication No. 2015/190411

SUMMARY OF THE INVENTION

Problems to be Solved by the Invention

However, when the assembly formed using the conventional technique is used in the presence of water, the assembly has a problem that peeling is promoted by the infiltration of the water into an adhesion interface, which causes a decreased adhesive force in a short time.

The assembly including the adhesive seal member described in Patent Document 1 has a problem that the assembly has relatively good water resistance, but has a significantly decreased adhesive force in the presence of hot water.

In the method for producing an assembly described in Patent Document 2, the low-polarity metal member having a ratio of a dipole term in surface free energy of 5.0% or less disadvantageously has poor water resistance, and particularly a significantly decreased adhesive force in the presence of hot water when the film thickness of the polyolefin is made thinner than 200 μm regardless of the presence or absence of a surface treatment.

The hot-melt adhesive resin film described in Patent Document 3 and the adhesive composition described in Patent Document 4 also disadvantageously have a significantly decreased adhesive force with respect to the low polarity metal member, and particularly in the presence of hot water.

The decrease in the adhesive force in the presence of hot water may be particularly problematic in an assembly used in the presence of hot water, such as an assembly for fuel cell.

An embodiment of the present disclosure has been made in view of the above circumstances, and an object of the present disclosure is to provide an assembly for fuel cell having an excellent adhesive force (hereinafter, may be referred to as "hot water resistance") in the presence of hot water.

An object of another embodiment of the present disclosure is to provide a laminated body used for the assembly for fuel cell having an excellent adhesive force in the presence of hot water.

Means for Solving the Problems

Means for solving the above problems include the following aspects.
<1> An assembly for fuel cell comprising:
  an adhesive resin layer containing a polyolefin having at least one group selected from the group consisting of an acidic group and an acid anhydride group and having an acid value of 0.01 mgKOH/g to 6.5 mgKOH/g; and
  two or more members bonded with the adhesive resin layer interposed therebetween,
  wherein at least one of the members is a metal member having a ratio of a dipole term in surface free energy of 0.01% to 5.0%.
<2> An assembly for fuel cell comprising:
  a laminated body including a resin substrate, an easily adhesive layer provided on at least one surface of the resin substrate, and an adhesive resin layer provided on a surface of the easily adhesive layer on a side opposite to the resin substrate, and containing a polyolefin having at least one group selected from the group consisting of an acidic group and an acid anhydride group and having an acid value of 0.01 mgKOH/g to 6.5 mgKOH/g; and
  a metal member bonded to at least a part of a surface of the adhesive resin layer of the laminated body and having a ratio of a dipole term in surface free energy of 0.01% to 5.0%.

<3> The assembly for fuel cell according to <2>, wherein
a solubility parameter of the easily adhesive layer is larger than a solubility parameter of the adhesive resin layer and smaller than a solubility parameter of the resin substrate, and
an absolute value of a difference between the solubility parameter of the easily adhesive layer and the solubility parameter of the adhesive resin layer is 3.0 $(J/cm^3)^{1/2}$ or less.

<4> The assembly for fuel cell according to <2> or <3>, wherein the easily adhesive layer has a thickness of 8 nm to 200 nm.

<5> The assembly for fuel cell according to any one of <2> to <4>, wherein the resin substrate has a glass transition temperature of 90° C. or higher.

<6> The assembly for fuel cell according to any one of <2> to <5>, wherein the laminated body includes the easily adhesive layer provided on each of both surfaces of the resin substrate, and the adhesive resin layer provided on each of surfaces of the easily adhesive layer on a side opposite to the resin substrate.

<7> The assembly for fuel cell according to any one of <1> to <6>, wherein
the acidic group contains a carboxylic acid group, and the acid anhydride group contains a carboxylic acid anhydride group.

<8> The assembly for fuel cell according to any one of <1> to <7>, wherein
the polyolefin contains a propylene unit, and
a content of the propylene unit is 50% by mass or more with respect to the polyolefin.

<9> The assembly for fuel cell according to any one of <1> to <8>, wherein the polyolefin has an acid value of 0.01 mgKOH/g to 3.0 mgKOH/g.

<10> The assembly for fuel cell according to any one of <1> to <9>, wherein the adhesive resin layer further contains a styrene-based thermoplastic elastomer.

<11> The assembly for fuel cell according to <10>, wherein a content of the styrene-based thermoplastic elastomer is 20% by mass or less with respect to a total amount of the polyolefin and the styrene-based thermoplastic elastomer.

<12> The assembly for fuel cell according to any one of <1> to <11>, wherein the adhesive resin layer has an acid value of 0.01 mgKOH/g to 6.5 mgKOH/g.

<13> The assembly for fuel cell according to any one of <1> to <12>, wherein a relationship between surface free energy $\gamma_M$ of the metal member and surface free energy $\gamma_A$ of the adhesive resin layer satisfies $\gamma_M - \gamma_A \geq 5.0$ mN/m.

<14> The assembly for fuel cell according to any one of <1> to <13>, wherein the metal member is titanium or a titanium alloy.

<15> A laminated body used for the assembly for fuel cell according to any one of <2> to <6>, the laminated body comprising:
a resin substrate;
an easily adhesive layer provided on at least one surface of the resin substrate; and
an adhesive resin layer provided on a surface of the easily adhesive layer on a side opposite to the resin substrate, and containing a polyolefin having at least one group selected from the group consisting of an acidic group and an acid anhydride group and having an acid value of 0.01 mgKOH/g to 6.5 mgKOH/g.

<16> A method for bonding a metal member of a fuel cell using a laminated body, wherein
the laminated body is the laminated body according to any one of <2> to <6>, and
the metal member has a ratio of a dipole term in surface free energy of 0.01% to 5.0%.

Effect of the Invention

An embodiment of the present disclosure can provide an assembly for fuel cell having an excellent adhesive force in the presence of hot water.

Another embodiment of the present disclosure can provide a laminated body used for the assembly for fuel cell having an excellent adhesive force in the presence of hot water.

MODE FOR CARRYING OUT THE INVENTION

Hereinafter, embodiments of the present disclosure will be described in detail. The present disclosure is not limited to the following embodiments at all, and may be implemented with appropriate modifications within the scope of the object of the present disclosure.

In the present disclosure, a numerical range represented by "to" means a range including numerical values described before and after "to" as a lower limit value and an upper limit value. In numerical ranges described stepwise in the present disclosure, an upper limit value or a lower limit value described in a certain numerical range may be replaced with an upper limit value or a lower limit value of another stepwise described numerical range. In the numerical range described in the present disclosure, the upper limit value or the lower limit value described in a certain numerical range may be replaced with a value shown in Examples.

In the present disclosure, "% by mass" and "% by weight" are synonymous, and "parts by mass" and "parts by weight" are synonymous.

In the present disclosure, combination of two or more preferred aspects is a more preferred aspect.

1. Assembly for Fuel Cell

An assembly for fuel cell according to an embodiment of the present disclosure includes: an adhesive resin layer containing a polyolefin having at least one group selected from the group consisting of an acidic group and an acid anhydride group and having an acid value of 0.01 mgKOH/g to 6.5 mgKOH/g; and two or more members bonded with the adhesive resin layer interposed therebetween. At least one of the members is a metal member having a ratio of a dipole term in surface free energy of 0.01% to 5.0%.

An assembly for fuel cell according to an embodiment of the present disclosure includes: a laminated body including a resin substrate, an easily adhesive layer provided on at least one surface of the resin substrate, and an adhesive resin layer provided on a surface of the easily adhesive layer on a side opposite to the resin substrate, and containing a polyolefin having at least one group selected from the group consisting of an acidic group and an acid anhydride group and having an acid value of 0.01 mgKOH/g to 6.5 mgKOH/g; and a metal member bonded to at least a part of a surface of the adhesive resin layer of the laminated body and having a ratio of a dipole term in surface free energy of 0.01% to 5.0%.

In the present disclosure, "at least a part of the surface of the adhesive resin layer" means at least a part of the surface of the adhesive resin layer present in the assembly for fuel cell of the present disclosure. In an embodiment of the assembly for fuel cell of the present disclosure, the metal member may be bonded to at least a part of the surface of the adhesive resin layer present in the assembly for fuel cell of the present disclosure, and when a plurality of adhesive resin layers are present, the metal member may not be bonded to the surfaces of all the adhesive resin layers. For example, when one adhesive resin layer is present in the assembly for fuel cell of the present disclosure, the metal member may be bonded to a part of the surface of the adhesive resin layer. When a plurality of adhesive resin layers are present in the assembly for fuel cell of the present disclosure, the metal member may be bonded to a part of a surface of at least one adhesive resin layer.

The assembly for fuel cell of the present disclosure has the adhesive resin layer containing the specific polyolefin, whereby the assembly for fuel cell has a high adhesive force with respect to the metal member having a ratio of a dipole term in surface free energy of 0.01% to 5.0%, and makes it possible to reduce the infiltration of water into an adhesive interface between the adhesive resin layer and the metal member. Therefore, the assembly for fuel cell of the present disclosure can exhibit an excellent adhesive force in the presence of hot water.

In an embodiment of the assembly for fuel cell of the present disclosure, the laminated body preferably includes the easily adhesive layer provided on each of both surfaces of the resin substrate, and the adhesive resin layer provided on each of surfaces of the easily adhesive layer on a side opposite to the resin substrate. The adhesive resin layer is provided on each of both surfaces of the laminated body, whereby two or more adherends can be bonded with the laminated body interposed therebetween. The compositions of the two easily adhesive layers may be the same or different. The compositions of the two adhesive resin layers may be the same or different.

Hereinafter, a specific embodiment of the assembly for fuel cell of the present disclosure will be described.

1-1. Adhesive Resin Layer

The adhesive resin layer contains a polyolefin (hereinafter, referred to as "component (A)") having at least one group selected from the group consisting of an acidic group and an acid anhydride group and having an acid value of 0.01 mgKOH/g to 6.5 mgKOH/g.

[Component (A)]

The component (A) has at least one group selected from the group consisting of an acidic group and an acid anhydride group.

Specific examples of the acidic group include a carboxylic acid group, a sulfonic acid group, and a phosphoric acid group. Among these, a carboxylic acid group is preferable from the viewpoint of easy modification.

Specific examples of the acid anhydride group include a carboxylic acid anhydride group, a sulfonic acid anhydride group, and a phosphoric acid anhydride group. Among these, a carboxylic acid anhydride group is preferable from the viewpoint of easy availability of raw materials and easy modification.

Among the above, from the viewpoint of hot water resistance, in the component (A), it is preferable that the acidic group contains a carboxylic acid group, and the acid anhydride group contains a carboxylic acid anhydride group.

The component (A) may be a polyolefin modified with an acidic group-containing monomer and/or an acid anhydride group-containing monomer. As a method for the modification, a known method can be employed. Examples of the method include graft modification such as melt-kneading an acidic group-containing monomer and/or an acid anhydride group-containing monomer with a polyolefin having no acidic group and no acid anhydride group in the presence of a radical polymerization initiator such as an organic peroxide or an aliphatic azo compound, and copolymerizing an acidic group-containing monomer and/or an acid anhydride group-containing monomer with an olefin.

(Acidic Group-Containing Monomer)

Examples of a raw material of the component (A) include an acidic group-containing monomer. Specifically, the acidic group-containing monomer is a compound having an ethylenic double bond and a carboxylic acid group and the like in the same molecule, and examples thereof include various unsaturated monocarboxylic acid compounds and unsaturated dicarboxylic acid compounds.

Specific examples of the unsaturated monocarboxylic acid compound include acrylic acid, methacrylic acid, crotonic acid, and isocrotonic acid.

Specific examples of the unsaturated dicarboxylic acid compound include maleic acid, itaconic acid, citraconic acid, nadic acid, and endic acid.

The acidic group-containing monomer is preferably an unsaturated dicarboxylic acid compound, and particularly preferably maleic acid, from the viewpoint of easy modification.

Only one of these acidic group-containing monomers may be used, or two or more thereof may be used in combination.

When a part of the acidic group-containing monomer used for modification remains unreacted, it is preferable to use the component (A) from which the unreacted acidic group-containing monomer has been removed by a known method, in order to suppress an adverse effect on an adhesive force.

(Acid Anhydride Group-Containing Monomer)

Examples of a raw material of the component (A) include an acid anhydride group-containing monomer. Specifically, the acid anhydride group-containing monomer is a compound having an ethylenic double bond and a carboxylic acid anhydride group and the like in the same molecule, and examples thereof include an acid anhydride of the unsaturated monocarboxylic acid compound, and an acid anhydride of the unsaturated dicarboxylic acid compound.

Specific examples of the acid anhydride of the unsaturated monocarboxylic acid compound include acrylic anhydride, methacrylic anhydride, crotonic anhydride, and isocrotonic anhydride.

Specific examples of the acid anhydride of the unsaturated dicarboxylic acid compound include maleic anhydride, itaconic anhydride, citraconic anhydride, nadic anhydride, and endic anhydride.

The acid anhydride group-containing monomer is preferably an acid anhydride of an unsaturated dicarboxylic acid compound, and particularly preferably maleic anhydride, from the viewpoint of easy modification.

Only one of these acid anhydride group-containing monomers may be used, or two or more thereof may be used in combination.

When a part of the acid anhydride group-containing monomer used for modification remains unreacted, it is preferable to use the component (A) from which the unreacted acid anhydride group-containing monomer has been removed by a known method, in order to suppress an adverse effect on an adhesive force.

(Polyolefin Having No Acidic Group and No Acid Anhydride Group)

Examples of a raw material of the component (A) include a polyolefin having no acidic group and no acid anhydride group (hereinafter, referred to as "component (a1)").

Specific examples of the component (a1) include polyethylene, polypropylene, a random copolymer of propylene and ethylene, a block copolymer of propylene and ethylene, a random copolymer of ethylene and an α-olefin, a block copolymer of ethylene and an α-olefin, a random copolymer of propylene and an α-olefin, and a block copolymer of propylene and an α-olefin. Examples of the α-olefin include 1-butene, isobutylene, 1-hexene, and 1-octene.

Among these, polypropylene-based polymers such as polypropylene, a propylene-ethylene block copolymer, a propylene-ethylene random copolymer, a propylene-α-olefin random copolymer, and a propylene-α-olefin block copolymer are preferable from the viewpoint of being able to improve hot water resistance. Furthermore, it is particularly preferable that the propylene unit constitutes 50% by mass or more of the component (a1).

Only one of the components (a1) may be used, or two or more thereof may be used in combination.

The acid value of the component (A) is 0.01 mgKOH/g to 6.5 mgKOH/g. From the viewpoint of being able to impart the adhesive force to the metal member, the acid value is 0.01 mgKOH/g or more, more preferably 0.1 mgKOH/g or more, and particularly preferably 0.5 mgKOH/g or more. From the viewpoint of being able to improve the hot water resistance, the acid value is 6.5 mgKOH/g or less, more preferably 3.0 mgKOH/g or less, still more preferably 2.0 mgKOH/g or less, and particularly preferably 1.0 mgKOH/g or less.

The acid value can be measured in accordance with JIS K 0070: 1992. Specifically, a precisely weighed sample is dissolved in a mixed solvent having a mass ratio of mixed xylene n-butanol=1:1 to obtain a sample solution. Next, to this sample solution, a few drops of 1 w/v % phenolphthalein solution in ethanol are added as an indicator. Using a 0.1 mol/L potassium hydroxide solution in ethyl alcohol as a titrant, titration is carried out. The acid value is calculated according to the following formula. In the following formula, T represents a titration amount (mL); F represents a factor of a titrant; and W represents a sampled amount (g).

$$\text{Acid value} = (T \times F \times 56.11 \times 0.1)/W$$

The melting point of the component (A) is preferably 100° C. to 200° C., and more preferably 120° C. to 180° C. The melting point is preferably 100° C. or higher from the viewpoint of being able to improve hot water resistance, and is preferably 200° C. or lower from the viewpoint of being able to improve processability.

The melting point can be obtained as a melting peak temperature when measurement is performed at a temperature rising rate of 10° C./min from 25° C. to 230° C. in a state where about 20 mg of a sample is sealed in an aluminum pan for measurement using a differential scanning calorimeter (DSC) (for example, DSCQ 100 manufactured by TA Instruments).

The melt flow rate (hereinafter, referred to as "MFR") of the component (A) is preferably 0.1 g/10 min to 30 g/10 min, and more preferably 0.1 g/10 min to 20 g/10 min under measurement conditions of 230° C. and a test pressure of 1.96 MPa. The melt flow rate is preferably 0.1 g/10 min or more from the viewpoint of being able to improve processability, and is preferably 30 g/10 min or less from the viewpoint of being able to improve hot water resistance.

The MFR can be measured under the following conditions in accordance with JIS K 7210: 2014.
Device: Flow tester CFT-500 (manufactured by Shimadzu Corporation)
Dice: Φ 1 mm×10 mm
Test pressure: 1.96 MPa
Cylinder area: 1 cm$^2$
Cylinder temperature: 230° C.

The component (A) preferably contains a propylene unit. The content of the propylene unit in the component (A) is preferably 50% by mass or more, more preferably 80% by mass or more, and still more preferably 90% by mass or more, with respect to the component (A), from the viewpoint of being able to improve hot water resistance.

In the adhesive resin layer of the present disclosure, only one of the components (A) may be used alone, or two or more thereof may be used in combination.

In the adhesive resin layer of the present disclosure, the content of the component (A) is preferably 80% by mass to 100% by mass, and more preferably 90% by mass to 100% by mass, based on 100% by mass of the adhesive resin layer because of excellent hot water resistance.

[Other Components]

The adhesive resin layer of the present disclosure contains the component (A), but may be supplemented with various components depending on purposes. The adhesive resin layer of the present disclosure preferably contains no polyfunctional isocyanate compound, and preferably contains, for example, 100 ppm or less of the polyfunctional isocyanate compound, because hot water resistance may be deteriorated.

Specific examples of the other components include a styrene-based thermoplastic elastomer (hereinafter, referred to as "component (B)"), a tackifier, an antioxidant, a hindered amine-based light stabilizer, an ultraviolet absorber, an anti-static agent, a flame retardant, a coloring agent, a dispersant, an adhesiveness imparting agent, a defoaming agent, a leveling agent, a plasticizer, a lubricant, and a filler. The adhesive resin layer of the present disclosure may contain a polyolefin (for example, the component (a1) and the like) other than the component (A).

Hereinafter, these components will be described.

As the other components described below, only one of the exemplified compounds may be used, or two or more thereof may be used in combination.

(Component (B))

The adhesive resin layer of the present disclosure may further contain a styrene-based thermoplastic elastomer as the component (B). The adhesive resin layer further contains the styrene-based thermoplastic elastomer, whereby the adhesive force of the adhesive resin layer can be improved.

Specific examples of the component (B) include styrene-based resins such as a styrene-butadiene copolymer, an epoxy-modified styrene-butadiene copolymer, a styrene-butadiene-styrene block copolymer, a styrene-ethylene/propylene-styrene block copolymer (hereinafter, referred to as "SEPS"), a styrene-ethylene/butylene-styrene block copolymer (hereinafter, referred to as "SEBS"), a styrene-isoprene/butadiene-styrene block copolymer, and a styrene-isoprene-styrene block copolymer. The component (B) may be one having no acidic group and no acid anhydride group, may be one having an acidic group and/or an acid anhydride group, or may be one having an amino group.

As a modification method for introducing an acidic group and/or an acid anhydride group, a known method may be employed. Examples thereof include graft modification such as melt-kneading the acidic group- and/or acid anhydride group-containing monomer with the styrene-based resin in the presence of a radical polymerization initiator such as an organic peroxide or an aliphatic azo compound.

As a modification method for introducing an amino group, a known method may be employed. Examples thereof include terminal modification such as adding an amino group-containing compound to a living terminal of the styrene-based resin obtained by living anionic polymerization, and graft modification such as melt-kneading an amine compound having an unsaturated bond such as 2-(1-cyclohexenyl)ethylamine with the styrene-based resin in the presence of a radical polymerization initiator such as an organic peroxide or an aliphatic azo compound.

The component (B) is preferably SEPS and SEBS from the viewpoint of being able to achieve both hot water resistance and processability.

The acid value of the component (B) is preferably 80 mgKOH/g or less from the viewpoint of being able to maintain stable quality. Furthermore, from the viewpoint of being able to improve hot water resistance, the acid value is more preferably 50 mgKOH/g or less, and particularly preferably 20 mgKOH/g or less, and may be 0.0 mgKOH/g. The acid value can be measured in accordance with JIS K 0070: 1992. Specifically, a precisely weighed sample is dissolved in a mixed solvent having a mass ratio of mixed xylene:n-butanol=1:1 to obtain a sample solution. Next, to this sample solution, a few drops of 1 w/v % phenolphthalein solution in ethanol are added as an indicator. Using a 0.1 mol/L potassium hydroxide solution in ethyl alcohol as a titrant, titration is carried out. The acid value is calculated according to the following formula. In the following formula, T represents a titration amount (mL); F represents a factor of a titrant; and W represents a sampled amount (g).

$$\text{Acid value}=(T\times F\times 56.11\times 0.1)/W$$

The MFR of the component (B) is preferably 1 g/10 min to 100 g/10 min, and more preferably 1 g/10 min to 90 g/10 min under measurement conditions of 230° C. and a test pressure of 1.96 MPa. The MFR is preferably 1 g/10 min or more from the viewpoint of being able to improve processability, and is preferably 100 g/10 min or less from the viewpoint of being able to improve hot water resistance.

The MFR can be measured under the following conditions in accordance with JIS K 7210: 2014.
Device: Flow tester CFT-500 (manufactured by Shimadzu Corporation)
Dice: Φ 1 mm×10 mm
Test pressure: 1.96 MPa
Cylinder area: 1 cm$^2$
Cylinder temperature: 230° C.

The content of the component (B) is preferably 20% by mass or less, more preferably 1% by mass to 20% by mass, and particularly preferably 1% by mass to 10% by mass, with respect to the total of the component (A) and the component (B). When the adhesive resin layer contains the component (B), the lower limit value of the content of the component (B) is not limited, and can be appropriately set in a range exceeding 0% by mass with respect to the total of the component (A) and the component (B). The content of the component (A) corresponding to the preferred range of the content of the component (B) may be 80% by mass or more, 80% by mass to 99% by mass, and 90% by mass to 99% by mass, with respect to the total of the component (A) and the component (B). The upper limit value of the content of the component (A) when the adhesive resin layer contains the component (B) can be appropriately set within a range of less than 100% by mass with respect to the total of the component (A) and the component (B).

The content of the component (B) is preferably 1% by mass or more from the viewpoint of excellent processability and an excellent adhesive force, and is preferably 20% by mass or less from the viewpoint of being able to improve hot water resistance.

(Tackifier)

The tackifier may be blended for the purpose of improving the adhesive force.

As the tackifier, a known tackifier may be used. Examples thereof include a terpene-based resin, a rosin-based resin, an aliphatic petroleum resin, an alicyclic petroleum resin, a copolymeric petroleum resin, and a hydrogenated petroleum resin.

Specific examples of the terpene-based resin include an α-pinene polymer, a β-pinene polymer, and copolymers of these with phenol or bisphenol A or the like.

Specific examples of the rosin-based resin include a natural rosin, a polymerized rosin, and ester derivatives thereof.

The aliphatic petroleum resin is also referred to as a C5 resin, and is generally a resin synthesized from a C5 fraction of petroleum.

The alicyclic petroleum resin is also referred to as a C9 resin, and is generally a resin synthesized from a C9 fraction of petroleum.

Specific examples of the copolymerized petroleum resin include a C5/C9 copolymerized resin.

The hydrogenated petroleum resin is generally produced by the hydrogenation of the various petroleum resins.

The content of the tackifier is preferably 1% by mass to 20% by mass, and more preferably 1% by mass to 10% by mass, with respect to 100% by mass of the adhesive resin layer, from the viewpoint of excellent hot water resistance.

[Acid Value]

The acid value of the adhesive resin layer is preferably 0.01 mgKOH/g to 6.5 mgKOH/g. The acid value is preferably 0.01 mgKOH/g or more, more preferably 0.1 mgKOH/g or more, and particularly preferably 0.5 mgKOH/g or more, from the viewpoint of being able to improve an adhesive force with respect to the metal member. The acid value is preferably 6.5 mgKOH/g or less, more preferably 3.0 mgKOH/g or less, and particularly preferably 1.5 mgKOH/g or less, from the viewpoint of being able to improve hot water resistance. The acid value can be measured in accordance with JIS K 0070: 1992. Specifically, a precisely weighed sample is dissolved in a mixed solvent having a mass ratio of mixed xylene:n-butanol=1:1 to obtain a sample solution. Next, to this sample solution, a few drops of 1 w/v % phenolphthalein solution in ethanol are added as an indicator. Using a 0.1 mol/L potassium hydroxide solution in ethyl alcohol as a titrant, titration is carried out. The acid value is calculated according to the following formula. In the following formula, T represents a titration amount (mL); F represents a factor of a titrant; and W represents a sampled amount (g).

$$\text{Acid value}=(T\times F\times 56.11\times 0.1)/W$$

Examples of a method in which the acid value of the adhesive resin layer is adjusted include a method in which the content of the component (A) in the adhesive resin layer is adjusted, and a method in which a polyolefin having an acid value of 0.05 mgKOH/g to 100 mgKOH/g and the component (a1) are blended.

The melting point of the adhesive resin layer is preferably 100° C. to 200° C., and more preferably 120° C. to 180° C. The melting point is preferably 100° C. or higher from the viewpoint of being able to improve hot water resistance, and is preferably 200° C. or lower from the viewpoint of being able to improve processability.

The melting point can be obtained as a melting peak temperature when measurement is performed at a temperature rising rate of 10° C./min from 25° C. to 230° C. in a state where about 20 mg of a sample is sealed in an aluminum pan for measurement using a differential scanning calorimeter (DSC) (for example, DSCQ 100 manufactured by TA Instruments).

[MFR]

The MFR of the adhesive resin layer is preferably 1 g/10 min to 30 g/10 min, and more preferably 5 g/10 min to 20 g/10 min under measurement conditions of 230° C. and a test pressure of 1.96 MPa. The MFR is preferably 1 g/10 min or more from the viewpoint of being able to improve processability, and is preferably 30 g/10 min or less from the viewpoint of being able to improve hot water resistance.

The MFR can be measured under the following conditions in accordance with JIS K 7210: 2014.

Device: Flow tester CFT-500 (manufactured by Shimadzu Corporation)
Dice: Φ 1 mm×10 mm
Test pressure: 1.96 MPa
Cylinder area: 1 cm$^2$
Cylinder temperature: 230° C.

[Thickness]

The thickness of the adhesive resin layer may be appropriately set according to the material and application and the like of the metal member without particular limitation, but is preferably 10 to 200 μm, and more preferably 20 to 200 μm.

[Method for Forming Adhesive Resin Layer]

The method for forming the adhesive resin layer is not limited, and can be appropriately selected from commonly used methods. For example, by melt-kneading a composition for forming an adhesive resin layer (hereinafter, referred to as "adhesive composition"), followed by extrusion molding, the adhesive resin layer can be formed on the easily adhesive layer. Examples of the extrusion molding include a co-extrusion method and an extrusion lamination method.

The adhesive composition can be produced by a known method. Specifically, the adhesive composition is preferably obtained by mixing the component (A) and, as necessary, other components using a Henschel mixer, a Banbury mixer, a V-type blender, a tumbler blender, or a ribbon blender or the like, and can be obtained in the form of pellets by melt-kneading the mixture at 180 to 300° C., and preferably 190 to 260° C. using a single-screw extruder, a multi-screw extruder, a roll, or a kneader or the like.

The adhesive composition can be used in the form of pellets, and the pellets can be used as the shape (hereinafter, referred to as "adhesive film") of a film or a sheet or the like using a film molding machine. An adhesive film may be used, in which the resin composition is melt-kneaded at a temperature of 50° C. to 200° C. by a T-die type, inflation type, calendar type, or screw type extruder, and an adhesive resin layer composed of an adhesive composition is laminated on one surface or both surfaces of a metal, glass, or thermoplastic resin member by extrusion molding.

When the thermoplastic resin member is used, an adhesive film including a thermoplastic resin layer is preferably obtained by subjecting the adhesive composition to extrusion molding according to a co-extrusion method or an extrusion lamination method.

1-2. Resin Substrate

In the present disclosure, the resin substrate is used as the substrate of the laminated body including an adhesive resin layer. The resin constituting the substrate can be selected according to characteristics required for the substrate in the intended application, but the glass transition temperature (Tg) is preferably higher, preferably 75° C. or higher, more preferably 90° C. or higher, and still more preferably 100° C. or higher in order to enhance an effect of improving the adhesiveness of the substrate to the adhesive resin layer in a wet heat environment and to enhance an effect of improving the adhesiveness of the substrate to the metal member. Accordingly, the resin is preferably a thermoplastic resin. The upper limit value of the glass transition temperature of the resin substrate is preferably 200° C. or lower from the viewpoint of handleability.

The glass transition temperature can be measured according to the following method.

10 mg of a sample was sealed within an aluminum measuring pan. The pan is mounted in a differential scanning calorimeter (DSC Model Q100 manufactured by TA Instruments). The temperature is increased from 25° C. to 300° C. at a rate of 20° C./min and is held at 300° C. for 5 min. Then, the pan is removed therefrom and quenched by cooling on a metal plate. The pan is again mounted in the differential scanning calorimeter. The temperature is increased from 25° C. at a rate of 20° C./min to measure a glass transition temperature (Tg: ° C.) and a melting point (Tm: ° C.). The glass transition temperature is taken as an extrapolated start temperature.

In order to obtain strength required as the substrate of the laminated body including the adhesive resin layer, the thickness of the resin substrate used in the present disclosure may be 20 μm or more. The thickness of the resin substrate is preferably 25 μm or more, more preferably 35 μm or more, and still more preferably 45 μm or more. The thickness of the resin substrate is preferably 300 μm or less, more preferably 270 μm or less, and still more preferably 250 μm or less. Alternatively, the thickness of the resin substrate may be 150 μm or less or 130 μm or less.

In the present disclosure, from the viewpoint of easily obtaining the glass transition temperature as described above, and from the viewpoint of satisfactory mechanical characteristics and the like and ease of handling, and the like, examples of the resin include a polyester resin, a polystyrene resin, and a polyamide-based resin. Examples of the polyamide-based resin include nylon 6 (N6), nylon 66 (N66), nylon 46 (N46), nylon 11 (N11), nylon 12 (N12), nylon 610 (N610), nylon 612 (N612), a nylon 6/66 copolymer (N6/66), a nylon 6/66/610 copolymer (N6/66/610), a nylon MXD6 (MXD6), nylon 6T, a nylon 6/6 T copolymer, a nylon 66/PP copolymer, and a nylon 66/PPS copolymer. Among these, a polyester resin having excellent moldability is preferable, that is, the resin substrate is preferably a polyester film.

The polyester resin constituting the polyester film in the present disclosure preferably has a glass transition temperature of 75° C. or higher. The glass transition temperature is 75° C. or higher, whereby excellent adhesiveness of the polyester film to the adhesive resin layer can be maintained under a wet heat environment, to lead to improvement in the adhesiveness of the polyester film to the metal member. The glass transition temperature is more preferably 90° C. or higher, and still more preferably 100° C. or higher.

As specific examples of the polyester resin, homopolymers of polyethylene terephthalate, polyethylene isophthalate, polybutylene terephthalate, polyethylene-2,6-naphthalate, polyethylene-2,7-naphthalate, and polybutylene-2,6-naphthalate can be preferably exemplified. When the glass transition temperature is preferably in a range of 75° C. or higher, other monomer may be copolymerized therewith to form a copolymerized polymer. The polyester resin may be a polymer blend.

As the copolymerization component, dicarboxylic acids such as oxalic acid, adipic acid, phthalic acid, sebacic acid, dodecanecarboxylic acid, isophthalic acid, terephthalic acid, 1,4-cyclohexanedicarboxylic acid, 4,4'-diphenyldicarboxylic acid, phenylindanedicarboxylic acid, 2,6-naphthalenedicarboxylic acid, 2,7-naphthalenedicarboxylic acid (when the main polymer is not polyethylene-2,7-naphthalate), tetralin dicarboxylic acid, decalin dicarboxylic acid, and diphenyl ether dicarboxylic acid, oxycarboxylic acids such as p-oxybenzoic acid and p-oxyethoxybenzoic acid, or dihydric alcohols such as propylene glycol, trimethylene glycol, tetramethylene glycol, hexamethylene glycol, cyclohexamethylene glycol, neopentyl glycol, an ethylene oxide adduct of bisphenol sulfone, an ethylene oxide adduct of bisphenol A, diethylene glycol, and polyethylene oxide glycol can be preferably used.

These compounds may be used not only alone but in combination of two or more thereof. Among these, more preferably, as the acid component, isophthalic acid, terephthalic acid, 4,4'-diphenyldicarboxylic acid, 2,6-naphthalenedicarboxylic acid, 2,7-naphthalenedicarboxylic acid, and p-oxybenzoic acid can be exemplified, and as the glycol component, trimethylene glycol, hexamethylene glycol, neopentyl glycol, and an ethylene oxide adduct of bisphenol sulfone can be exemplified.

As a preferred example of the polyester resin having a glass transition temperature of 90° C. or higher, polyethylene naphthalate is particularly preferable. As long as the glass transition temperature is 90° C. or higher, the polyethylene naphthalate may be a copolymerized polymer. The polyethylene naphthalate may be a polymer blend. Among these, a polyester resin mainly composed of polyethylene-2,6-naphthalate is preferable because the polyester resin has good mechanical properties and wet heat resistance. Here, "mainly composed of" means that 90 mol % or more, and preferably 95 mol % or more of all repeating units of the polyester resin are ethylene-2,6-naphthalate units.

[Additives]

The resin substrate in the present disclosure may contain an appropriate filler as necessary for improvement in lubricity, and the like as long as the object of the present disclosure is not hindered. As the filler, those conventionally known as a lubricity imparting agent for a film such as a polyester film and a sheet can be used. Examples thereof include calcium carbonate, calcium oxide, aluminum oxide, kaolin, silicon oxide, zinc oxide, carbon black, silicon carbide, tin oxide, crosslinked acrylic resin particles, crosslinked polystyrene resin particles, melamine resin particles, and crosslinked silicon resin particles. Furthermore, a coloring agent, an anti-static agent, an antioxidant, an organic lubricant, and a catalyst and the like can also be appropriately added to the resin substrate.

[Production Method]

The resin substrate used in the present disclosure and the resin used therein can be produced by methods conventionally known to those skilled in the art.

Hereinafter, a case where a polyester resin is used as the resin will be described as a representative example. Also, in the case of other resins, the resin substrate may be obtained with reference to the following.

(Method for Producing Polyester)

The polyester resin in the present disclosure can be obtained by conventionally known methods, for example, a method in which a polyester resin having a low degree of polymerization is directly obtained by the reaction of a glycol with a carboxylic acid such as terephthalic acid or naphthalenedicarboxylic acid, and a method in which a lower alkyl ester of a dicarboxylic acid is reacted with a glycol using a transesterification catalyst, followed by performing polymerization in the presence of a polymerization catalyst, and the like.

As the transesterification catalyst described above, one or two or more of compounds containing sodium, potassium, magnesium, calcium, zinc, strontium, titanium, zirconium, manganese, and cobalt can be used. Examples of the polymerization catalyst include antimony compounds such as antimony trioxide and antimony pentoxide, germanium compounds represented by germanium dioxide, and titanium compounds such as tetraethyl titanate, tetrapropyl titanate, tetraphenyl titanate, or partial hydrolysates thereof, titanyl ammonium oxalate, titanyl potassium oxalate, and titanium trisacetylacetonate.

When polymerization is performed via the transesterification reaction, phosphorous compounds such as trimethyl phosphate, triethyl phosphate, tri-n-butyl phosphate, and orthophosphoric acid are added before the polymerization reaction for the purpose of deactivating the transesterification catalyst, but the content of a phosphorus element in the polyester resin is preferably 20 ppm by mass to 100 ppm by mass from the viewpoint of the thermal stability of the polyester resin.

The polyester resin may be formed into chips after melt polymerization, and subjected to solid phase polymerization with application of heat under reduced pressure or in a stream of inert gas such as nitrogen.

The intrinsic viscosity (35° C., orthochlorophenol) of the polyester resin constituting the resin substrate is preferably 0.40 dl/g or more, and more preferably 0.40 dl/g to 0.90 dl/g. When the intrinsic viscosity is too low, operations tend to easily be interrupted. When the intrinsic viscosity is too high, the melt viscosity tends to be high, whereby melt-extruding tends to be difficult, and a polymerization time tends to be long. When the intrinsic viscosity is too low, hydrolysis resistance also tends to decrease.

(Method for Producing Polyester Film)

The polyester film used in the present disclosure can be obtained as follows. For example, the polyester resin is melt-extruded into a sheet, and cooled and solidified by a casting drum to form an unstretched film. The unstretched film is stretched in a machine direction (forming machine axial direction; also referred to as longitudinal direction or machine direction (MD)) once, or two or more times, at "Tg (unit: ° C.)" to "Tg (unit: ° C.)+60° C." so that total stretching corresponds to a factor of 3 times to 6 times, stretched in a transverse direction (direction perpendicular to the film forming machine axial direction and to a thickness direction; also referred to as lateral direction or transverse direction (TD)) once, or two or more times, at "Tg (unit: ° C.)" to "Tg (unit: ° C.)+60° C." so that total stretching corresponds to a factor of 3 times to 5 times, heat-treated as necessary for 1 to 60 seconds at "Tm (unit: ° C.)−80° C." to "Tm (unit: ° C.)−20° C.", and heat-treated again as necessary while being contracted by 0% to 20% in the transverse direction at a temperature which is 10° C. to 20° C. lower than a heat treatment temperature. Here, Tg represents the glass transition temperature of the polyester resin which serves as a raw material of the film, and Tm represents the melting point. The above stretching may be sequential biaxial stretching or may be simultaneous biaxial stretching.

1-3. Easily Adhesive Layer

In the present disclosure, in order to impart excellent adhesion to the resin substrate, a layer intended for easy adhesion (hereinafter, referred to as "easily adhesive layer") is formed on at least one surface of the resin substrate. The easily adhesive layer may be a coating film. The easily adhesive layer can provide improved adhesiveness to the adhesive resin layer of the present disclosure.

As the component constituting the easily adhesive layer, any component may be used as long as the object of the present disclosure is achieved, but the solubility parameter (hereinafter, abbreviated as "SP value") is preferably between the SP value of the adhesive resin layer and the SP value of the resin substrate from the viewpoint of adhesion.

It is preferable that the SP value of the easily adhesive layer is larger than the SP value of the adhesive resin layer, and smaller than the SP value of the resin substrate. In the above magnitude relationship among the SP value of the easily adhesive layer, the SP value of the adhesive resin layer, and the SP value of the resin substrate, the absolute value of a difference between the SP value of the easily adhesive layer and the SP value of the adhesive resin layer is preferably 3.0 $(J/cm^3)^{1/2}$ or less, more preferably 2.5 $(J/cm^3)^{1/2}$ or less, and particularly preferably 2.0 $(J/cm^3)^{1/2}$ or less. The lower limit value of the absolute value of the difference between the SP value of the easily adhesive layer and the SP value of the adhesive resin layer is preferably more than 0 $(J/cm^3)^{1/2}$, and more preferably 1.0 $(J/cm^3)^{1/2}$ or more.

The solubility parameter can be obtained using the Fedors calculating formula. Specifically, the SP value is obtained by calculation from the chemical structural formulae of the resin substrate, the adhesive resin layer, and the easily adhesive layer by referring to "Polymer Eng. & Sci.", Vol. 14, No. 2 (1974), pages 148 to 154 using the Fedors calculating formula.

$$\delta i = [Ev/V]^{1/2} = [\Delta ei/\Delta vi]^{1/2}$$

Ev: Evaporation energy
V: Molar volume
Δei: evaporation energy of atom or atom group of component i
Δvi: molar volume of atom or atom group of component i The SP value is obtained from the following formula as the sum of all atoms or all atom groups.

$$\sigma = (\Sigma ei/\Sigma vi)^{1/2}$$

The easily adhesive layer is particularly preferably composed of a composition containing, as a main component, at least one binder resin selected from a polyester resin, an acrylic resin, and a polyurethane resin. As the polyester resin, an acryl-based resin-modified polyester resin and a vinyl-based resin-modified polyester resin can be preferably exemplified.

As the component constituting the polyester resin, a component derived from the following polycarboxylic acid and polyhydroxy compound (that is, referred to as constituent unit, the same applies hereinafter) can be exemplified. That is, usable examples of the component derived from the polycarboxylic acid include components derived from terephthalic acid, isophthalic acid, orthophthalic acid, 4,4'-diphenyldicarboxylic acid, 2,5-naphthalenedicarboxylic acid, 2,6-naphthalenedicarboxylic acid, 1,4-cyclohexanedicarboxylic acid, 2-potassium sulfoterephthalate, 5-sodium sulfoisophthalate, adipic acid, azelaic acid, sebacic acid, dodecanedicarboxylic acid, glutaric acid, succinic acid, trimellitic acid, trimesic acid, trimellitic anhydride, phthalic anhydride, p-hydroxybenzoic acid, trimellitic monopotassium, and ester-forming derivatives thereof and the like. Usable examples of the component derived from the polyhydroxy compound include components derived from ethylene glycol, 1,2-propylene glycol, 1,3-propylene glycol, 1,4-butanediol, 1,6-hexanediol, 2-methyl-1,5-pentanediol, neopentyl glycol, 1,4-cyclohexanedimethanol, p-xylylene glycol, a bisphenol A-ethylene glycol adduct, a bisphenol A-1,2-propylene glycol adduct, diethylene glycol, triethylene glycol, polyethylene glycol, polypropylene glycol, polytetramethylene glycol, polytetramethylene oxide glycol, dimethylolpropionic acid, glycerine, trimethylolpropane, sodium dimethylol ethyl sulfonate, and potassium dimethylolpropionate and the like. The polyester resin is synthesized by subjecting one or more polycarboxylic acid compounds and one or more polyhydroxy compounds appropriately selected from these compounds to a conventional polycondensation reaction. In addition to the above, the polyester resin may be a composite polymer having a polyester component such as an acryl-based resin-modified polyester resin, a vinyl-based resin-modified polyester resin, or a polyester polyurethane obtained by chain-extending a polyester polyol with an isocyanate, as described later.

The component constituting the acrylic resin is preferably a component derived from an alkyl acrylate or an alkyl methacrylate as a main component, and more preferably a water-soluble or water-dispersible resin containing 30 mol % to 90 mol % of the component with respect to the acrylic resin and 70 mol % to 10 mol % of a component derived from a copolymerizable vinyl monomer having a functional group.

The vinyl monomer copolymerizable with an alkyl acrylate or an alkyl methacrylate and having a functional group is a vinyl monomer having, as a functional group, a carboxyl group or a salt thereof, an acid anhydride group, a sulfonic acid group or a salt thereof, an amide group or an alkylolated amide group, an amino group (containing a substituted amino group), an alkylolated amino group or a salt thereof, a hydroxyl group, or an epoxy group or the like. Among these, the functional group is particularly preferably a carboxyl group or a salt thereof, an acid anhydride group, and an epoxy group and the like. Two or more of these groups may be contained in the resin.

Examples of the alkyl group of the alkyl acrylate and alkyl methacrylate include a methyl group, an ethyl group, an n-propyl group, an isopropyl group, an n-butyl group, an isobutyl group, a t-butyl group, a 2-ethylhexyl group, a lauryl group, a stearyl group, and a cyclohexyl group.

Usable examples of the vinyl-based monomer having a functional group copolymerized with an alkyl acrylate or an alkyl methacrylate include the following compounds having functional groups such as a reactive functional group, a self-crosslinkable functional group, and a hydrophilic group. Examples of a compound having a carboxyl group or a salt thereof, or an acid anhydride group include acrylic acid, methacrylic acid, itaconic acid, maleic acid, salts of these carboxylic acids with a metal such as sodium or ammonia, and maleic anhydride.

Examples of a compound having a sulfonic acid group or a salt thereof include vinylsulfonic acid, styrenesulfonic acid, and salts of these sulfonic acids with a metal such as sodium or ammonia.

Examples of a compound having an amide group or an alkylolated amide group include acrylamide, methacrylamide, N-methylmethacrylamide, methylolated acrylamide, methylolated methacrylamide, ureido vinyl ether, β-ureido-isobutyl vinyl ether, and ureidoethyl acrylate.

Examples of a compound having an amino group, an alkylolated amino group, or salts thereof include diethylaminoethyl vinyl ether, 2-aminoethyl vinyl ether, 3-aminopropyl vinyl ether, 2-aminobutyl vinyl ether, dimethylaminoethyl methacrylate, dimethylaminoethyl vinyl ether, compounds obtained by methylolating the amino groups of these compounds, and compounds obtained by quaternizing the amino groups of these compounds with an alkyl halide, dimethyl sulfate, or sultone or the like.

Examples of a compound having a hydroxyl group include β-hydroxyethyl acrylate, β-hydroxyethyl methacrylate, β-hydroxypropyl acrylate, β-hydroxypropyl methacrylate, β-hydroxyethyl vinyl ether, 5-hydroxypentyl vinyl ether, 6-hydroxyhexyl vinyl ether, polyethylene glycol monoacrylate, polyethylene glycol monomethacrylate, polypropylene glycol monoacrylate, and polypropylene glycol monomethacrylate. Examples of a compound having an epoxy group include glycidyl acrylate and glycidyl methacrylate. Examples of compounds having other functional groups include vinyl isocyanate and allyl isocyanate.

Examples of the vinyl-based monomer compound further include olefins such as ethylene, propylene, methylpentene, butadiene, styrene and α-methylstyrene, vinyl methyl ether, vinyl ethyl ether, vinyltrialkoxysilane, acrylonitrile, methacrylonitrile, vinylidene chloride, vinyl chloride, vinylidene fluoride, ethylene tetrafluoride, and vinyl acetate.

As the component constituting the polyurethane resin, a component derived from a polyhydroxy compound, a component derived from a polyisocyanate compound, a component derived from a chain extender, and a component derived from a crosslinking agent, and the like as described later can be exemplified. That is, usable examples of the component derived from the polyhydroxy compound include components derived from polyethers such as polyoxyethylene glycol, polyoxypropylene glycol, and polyoxytetramethylene glycol, polyesters such as polyethylene adipate, polyethylene-butylene adipate, and polycaprolactone, polycarbonates, acrylic polyols, and a castor oil and the like. Usable examples of the component derived from the polyisocyanate compound include components derived from tolylene diisocyanate, phenylene diisocyanate, 4,4'-diphenylmethane diisocyanate, hexamethylene diisocyanate, xylylene diisocyanate, 4,4'-dicyclohexylmethane diisocyanate, and isophorone diisocyanate and the like. Usable examples of the component derived from the chain extender or the component derived from the crosslinking agent include components derived from ethylene glycol, propylene glycol, diethylene glycol, trimethylol propane, hydrazine, ethylenediamine, diethylenetriamine, an ethylenediamine-sodium acrylate adduct, 4,4'-diaminodiphenylmethane, 4,4'-diaminodicyclohexylmethane, and water and the like. One or more compounds are appropriately selected from these compounds for each of the chain extender and the crosslinking agent, and a polyurethane resin is synthesized by a conventional polycondensation-crosslinking reaction.

The acryl-based resin-modified polyester resin and the vinyl-based resin-modified polyester resin can be synthesized by polymerizing an acryl-based resin or a vinyl-based resin in an aqueous solution or an aqueous dispersion of a polyester. As the component constituting the polyester, a component derived from a polycarboxylic acid, a component derived from a polyhydroxy compound, and components derived from ester-forming derivatives of these compounds, which are the same as those described above can be exemplified.

As the components constituting the acryl-based resin and the vinyl-based resin, one or two or more of a component derived from an alkyl acrylate or a component derived from an alkyl methacrylate which is the same as those described above, or a component derived from a vinyl-based monomer compound which is the same as those described above and copolymerized therewith can be appropriately used.

As the acrylic-based resin-modified polyester resin and the vinyl-based resin-modified polyester resin of the present disclosure, those having a molecular structure such as a so-called acrylic graft polyester described in JP-A-1-165633 are also included.

The content of the binder resin in the easily adhesive layer is preferably 80% by mass or more, and more preferably 90% by mass or more with respect to the total mass of the easily adhesive layer.

1-4. Metal Member

The metal member is not limited as long as the ratio of a dipole term in surface free energy is 0.01% to 5.0%, and examples thereof include metal members containing iron, aluminum, titanium, magnesium, copper, nickel, and chromium and the like. Among the above, from the viewpoint of excellent acid resistance, a metal member containing titanium is preferable. Specific examples of the metal member include iron, aluminum, titanium, magnesium, copper, nickel, chromium, other metals, and alloys thereof. Among the above, the metal member is preferably titanium or a titanium alloy from the viewpoint of excellent acid resistance.

From the viewpoint of excellent hot water resistance, the ratio of the dipole term in the surface free energy is preferably 0.01% to 2.5%, more preferably 0.01% to 1.5%, and particularly preferably 0.01% to 1.0%.

Here, the surface free energy of the metal member, and the dispersion term, dipole term, and hydrogen bond term thereof are represented by the following abbreviations. The ratio of the dipole term in the surface free energy of the metal member is calculated by "$\gamma_M^P/\gamma^M \times 100$".

$\gamma_M$: surface free energy of metal member ($\gamma_M^D + \gamma_M^P + \gamma_M^H$)
$\gamma_M^D$: dispersion term of surface free energy of metal member
$\gamma_M^P$: dipole term of surface free energy of metal member
$\gamma_M^H$: hydrogen bond term of surface free energy of metal member The $\gamma_M$, $\gamma_M^D$, $\gamma_M^P$, and $\gamma_M^H$ are calculated by measuring a contact angle according to a three-point method under the following conditions by the sessile drop method using a contact angle meter defined in JIS R 3257: 1999 and using the extended Fowkes formula.

Measurement temperature: 25° C.

Liquid: water, α-bromonaphthalene, diiodomethane

The thickness of the metal member may be appropriately set according to the material and application thereof, and the like without particular limitation.

The shape of the metal member may be appropriately set according to the application and the like without particular limitation, but examples thereof include a film shape, a sheet shape, a plate shape, an angle shape, and a rod shape. In particular, examples of a metal member for fuel cell which is required to have hot water resistance include a fuel cell separator.

In the assembly for fuel cell of the present disclosure, from the viewpoint of hot water resistance, the relationship between the surface free energy $\gamma_M$ of the metal member and the surface free energy $\gamma_A$ of the adhesive resin layer preferably satisfies $\gamma_M - \gamma_A \geq 5.0$ mN/m, and more preferably satisfies $\gamma_M - \gamma_A$ 6.0 mN/m. Furthermore, from the viewpoint of peel strength, the difference between the surface free energy of the metal member and the surface free energy of the adhesive resin layer preferably satisfies $\gamma_M - \gamma_A \geq 10.0$ mN/m. The relationship between the surface free energy $\gamma_M$ of the metal member and the surface free energy $\gamma_A$ of the adhesive resin layer preferably satisfies $\gamma_M-\gamma_A \leq 30$ mN/m, more preferably satisfies $\gamma_M-\gamma_A<15$ mN/m, and particularly preferably 13 mN/m or less, from the viewpoint of being able to maintain stable quality, hot water resistance, and peel strength.

Here, the surface free energy of the adhesive resin layer, and the dispersion term, dipole term, and hydrogen bond term thereof are represented by the following abbreviations.

$\gamma_A$: surface free energy ($\gamma_A^D+\gamma_A^P+\gamma_A^H$) of adhesive resin layer $\gamma_A^D$: dispersion term of surface free energy of adhesive resin layer $\gamma_A^P$: dipole term of surface free energy of adhesive resin layer $\gamma_A^H$: hydrogen bond term of surface free energy of adhesive resin layer The $\gamma_A$, $\gamma_A^D$, $\gamma_A^P$, and $\gamma_A^H$ are calculated by measuring a contact angle according to a three-point method under the following conditions by the sessile drop method using a contact angle meter defined in JIS R 3257: 1999 and using the extended Fowkes formula.

Measurement temperature: 25° C.
Liquid: water, α-bromonaphthalene, diiodomethane 1-5. Other Members Examples of members other than the metal member among the members bonded to the adhesive resin layer included in the assembly for fuel cell of the present disclosure (hereinafter, may be referred to as "other members") include glass and a thermoplastic resin.

Examples of the glass include alkali glass, alkali-free glass, and quartz glass and the like.

Examples of the thermoplastic resin include a polyolefin-based resin, a polyester-based resin, a polyamide-based resin, a polyacrylonitrile-based resin, a polyvinyl alcohol-based resin, and a polyvinyl chloride-based resin.

The shape of the other member may be appropriately set according to the application and the like without particular limitation, but examples thereof include a film shape, a sheet shape, a plate shape, an angle shape, and a rod shape and the like.

2. Application

The assembly for fuel cell of the present disclosure has excellent hot water resistance, whereby the assembly for fuel cell can be suitably used as a member of a fuel cell in the field of an on-vehicle battery and the like. In particular, the assembly for fuel cell can be suitably used as the assembly of a fuel cell separator.

3. Laminated Body

The laminated body of the present disclosure includes a resin substrate, an easily adhesive layer provided on at least one surface of the resin substrate, and an adhesive resin layer provided on a surface of the easily adhesive layer on a side opposite to the resin substrate, and containing a polyolefin having at least one group selected from the group consisting of an acidic group and an acid anhydride group and having an acid value of 0.01 mgKOH/g to 6.5 mgKOH/g. The laminated body is used for the assembly for fuel cell of the present disclosure. The aspect of the laminated body of the present disclosure is the same as the aspect of the laminated body described in the above "1. Assembly for Fuel Cell", and preferred aspects thereof are also the same.

Examples

Hereinafter, the present disclosure will be described in detail with reference to Examples, but the present disclosure is not limited thereto. Unless otherwise specified, "parts" and "%" are based on mass.

1. Measuring Method [Acid Value]

An acid value indicates the number of milligrams of potassium hydroxide required to neutralize an acid contained in 1 g of a sample.

The acid value was measured in accordance with JIS K 0070: 1992.

Specifically, a precisely weighed sample is dissolved in a mixed solvent having a mass ratio of mixed xylene:n-butanol=1:1 to obtain a sample solution. Next, to this sample solution, a few drops of 1 w/v % phenolphthalein solution in ethanol are added as an indicator. Using a 0.1 mol/L potassium hydroxide solution in ethyl alcohol as a titrant, titration is carried out. The acid value is calculated according to the following formula.

$$\text{Acid value}=(T \times F \times 56.11 \times 0.1)/W$$

Here, in the above calculation formula, T represents a titration amount (mL); F represents a factor of a titrant; and W represents a sampled amount (g).

[MFR]

MFR (unit: g/10 min) was measured under the following conditions.

Device: Flow tester CFT-500 (manufactured by Shimadzu Corporation)
Dice: Φ 1 mm×10 mm
Test pressure: 1.96 MPa
Cylinder area: 1 cm$^2$
Cylinder temperature: 230° C.

[Surface Free Energy]

A contact angle was measured by a three-point method under the following conditions according to the sessile drop method using a contact angle meter defined in JIS R 3257: 1999, and $\gamma_M$, $\gamma_M^D$, $\gamma_M^P$, $\gamma_M^H$, $\gamma_A$, $\gamma_A^D$, $\gamma_A^P$, and $\gamma_A^H$ were calculated using the extended Fowkes formula. The $\gamma_L$, $\gamma_L^D$, $\gamma_L^P$, and $\gamma_L^H$ of each liquid used in the sessile drop method are shown in Table 1 below.

Device: CA-X type contact angle meter (manufactured by Kyowa Interface Science Co., Ltd.)
Measurement temperature: 25° C.
Liquid: water, α-bromonaphthalene, diiodomethane

TABLE 1

| Liquid | $\gamma_L$ | $\gamma_L^D$ | $\gamma_L^P$ | $\gamma_L^H$ |
|---|---|---|---|---|
| Water | 72.8 | 29.1 | 1.3 | 42.4 |
| α-bromonaphthalene | 44.6 | 44.4 | 0.2 | 0.0 |
| Diiodomethane | 50.8 | 46.8 | 4.0 | 0.0 |

[Glass Transition Temperature]

10 mg of a sample was sealed within an aluminum measuring pan. The pan was mounted in a differential scanning calorimeter (DSC Model Q100 manufactured by TA Instruments). The temperature was increased from 25° C. to 300° C. at a rate of 20° C./min, and was held at 300° C. for 5 min. Then, the pan was removed therefrom and quenched by cooling on a metal plate. The pan was again mounted in the differential scanning calorimeter, and the temperature was increased from 25° C. at a rate of 20° C./min to measure a glass transition temperature (Tg: ° C.)

and a melting point (Tm: ° C.). The glass transition temperature was taken as an extrapolated start temperature.
[Thickness]
The thickness of each layer was measured according to the provision of JIS K 7130: 1999.
[Solubility Parameter (SP Value)]
The SP value was obtained by the following method.
The SP value was obtained by calculation from the chemical structural formulae of a resin substrate, adhesive resin layer, and easily adhesive layer used by referring to "Polymer Eng. & Sci.", Vol. 14, No. 2 (1974), pages 148 to 154 using the Fedors calculating formula.

$$\delta i = [Ev/V]^{1/2} = [\Delta ei/\Delta vi]^{1/2}$$

Ev: Evaporation energy
V: Molar volume
$\Delta ei$: evaporation energy of atom or atom group of component i
$\Delta vi$: molar volume of atom or atom group of component i The SP value was obtained from the following formula as the sum of all atoms or all atom groups.

$$\sigma = (\Sigma ei / \Sigma vi)^{1/2}$$

2. Physical Properties of Resin Used

The acid values and MFRs of the resins used are shown in the following Table 2.

TABLE 2

| | | Structure | Acid value 1) | MFR 2) |
|---|---|---|---|---|
| Component (A) | A1 | Polypropylene having acidic group and acid anhydride group (propylene unit: 94.93% by mass, olefin unit other than propylene: 5.00% by mass, maleic anhydride unit (containing partially hydrolyzed one): 0.07% by mass) | 0.76 | 8.2 |
| | A2 | Polypropylene having acidic group and acid anhydride group (propylene unit: 99.92% by mass, maleic anhydride unit (containing partially hydrolyzed one): 0.08% by mass) | 0.80 | 9.1 |
| Component (B) | B1 | Styrene-ethylene/propylene-styrene type block copolymer having no acidic group and no acid anhydride group (styrene unit: 30% by mass) | 0.0 | 70 |
| | B2 | Styrene-ethylene/butylene-styrene type block copolymer having acidic group and acid anhydride group (styrene unit: 20% by mass, maleic anhydride unit (containing partially hydrolyzed one): 1.03% by mass) | 10.0 | 8.0 |
| | B3 | Styrene-ethylene/butylene-styrene type block copolymer having amino group (styrene unit: 30% by mass) | 0.0 | 4.0 |
| PA | | Nylon-based copolymerized polyamide resin | 7.0 | 6.0 |
| PES | | Saturated copolymerized polyester resin | 0.8 | 60 |
| PP | | Polypropylene having acidic group and acid anhydride group (propylene unit: 80.85% by mass, olefin unit other than propylene: 14.55% by mass, maleic anhydride unit (containing partially hydrolyzed one): 4.6% by mass) | 10.3 | 22 |

1) Acid value: mgKOH/g
2) MFR: g/10 min

3. Physical Properties of Metal Members Used

Table 3 below shows the material, surface free energy, a dispersion term, dipole term, and hydrogen bond term thereof, and the ratio of the dipole term to the surface free energy of each of five metal members (M1 to M5) used. As the metal member, a plate having a size of 10 mm×30 mm and a thickness of 100 μm was used.

TABLE 3

| Metal member | M1 | M2 | M3 | M4 | M5 |
|---|---|---|---|---|---|
| Material | Titanium | Titanium | Titanium | Titanium | Titanium |
| Surface free energy $\gamma_M$ | 47.1 | 49.7 | 50.9 | 45.0 | 51.6 |
| Dispersion term $\gamma_M^D$ | 45.0 | 43.0 | 43.0 | 45.0 | 47.8 |
| Dipole term $\gamma_M^P$ | 0.4 | 3.2 | 5.6 | 0.0 | 2.5 |
| Hydrogen bond term $\gamma_M^H$ | 1.7 | 3.5 | 2.3 | 0.0 | 1.1 |
| Ratio of dipole term: $\gamma_M^P/\gamma_M \times 100$ (%) | 0.85 | 6.4 | 11.0 | 0.0 | 4.8 |

4. Example 1 [Production of Laminated Body]

(Preparation of Easy Adhesive Agent)
An easy adhesive agent (solid content concentration: 4% by mass) was prepared according to the following formulation. As a diluent solvent, ion-exchanged water was used.
Acrylic resin (trade name: RX7770 manufactured by Nippon Carbide Co., Ltd.): 85 parts by mass
Epoxy-based crosslinking agent (trade name: TETRAD-X manufactured by Mitsubishi Gas Chemical Co., Ltd.): 7.5 parts by mass
Surfactant (trade name: SANNONIC SS-70 manufactured by Sanyo Chemical Industries, Ltd.): 7.5 parts by mass
(Production of Resin Substrate Including Easily Adhesive Layer)
Polyethylene-2,6-naphthalate (shown as "PEN" in Table 4) having an intrinsic viscosity of 0.60 dl/g (35° C., ortho-chlorophenol) was synthesized using manganese acetate tetrahydrate as a transesterification catalyst and antimony trioxide as a polymerization catalyst. The obtained resin was dried with a dryer at 170° C. for 6 hours, then charged into an extruder, where the resin was melt-kneaded at a melting temperature of 300° C. The resin was extruded through a die slit at 300° C., and then cooled and solidified on a casting drum set at a surface temperature of 25° C. to prepare an unstretched film. The unstretched film was guided to a group of rolls heated to 140° C., stretched by a factor of 3.5 times in a machine direction, and cooled by a group of rolls at 25° C.

The easy adhesive agent was applied to each of both surfaces of the film after longitudinal stretching by a roll coater method so that the thickness of an easily adhesive layer in a laminated body to be finally obtained was 50 nm. Subsequently, the film was guided into a tenter while both ends of the film were held by clips, where the film was stretched by a factor of 3.5 times in a transverse direction in an atmosphere heated to 135° C. In the tenter, heat fixation was performed at 220° C. for 40 seconds. The film was relaxed by 1% in a transverse direction at 220° C., and then uniformly cooled slowly to room temperature to obtain a biaxially stretched film having a thickness of 200 μm.
(Formation of Adhesive Resin Layer)

Next, adhesive resin layers having compositions shown in Table 4 were formed on the easily adhesive layers on both surfaces of the obtained biaxially stretched film by an extrusion lamination method to obtain a laminated body. The thickness of each of the obtained adhesive resin layers was 50 μm. The extrusion lamination condition included an extrusion temperature of 230° C.

5. Examples 2 to 5 and 10, and Comparative Examples 1 to 8

A laminated body was produced in the same manner as in Example 1 except that the configuration of an adhesive resin layer, and a metal member to be used were changed as shown in Table 4.

6. Example 6

A laminated body was produced in the same manner as in Example 1 except that a resin substrate including an easily adhesive layer was produced according to the following.

Polyethylene terephthalate (shown as "PET" in Table 4) having an intrinsic viscosity of 0.58 dl/g (35° C., orthochlorophenol) was synthesized as a resin using manganese acetate tetrahydrate as a transesterification catalyst and antimony trioxide as a polymerization catalyst. The obtained resin was dried with a dryer at 170° C. for 6 hours, then charged into an extruder, where the resin was melt-kneaded at a melting temperature of 300° C.

The resin was extruded through a die slit at 300° C., and then cooled and solidified on a casting drum set at a surface temperature of 25° C. to prepare an unstretched film.

The unstretched film was guided to a group of rolls heated to 140° C., stretched by a factor of 3.5 times in a machine direction, and cooled by a group of rolls at 25° C.

Subsequently, an easy adhesive agent was applied to each of both surfaces of the film after longitudinal stretching by a roll coater method in the same manner as in Example 1.

Subsequently, the film was guided into a tenter while both ends of the film were held by clips, where the film was stretched by a factor of 3.5 times in a transverse direction in an atmosphere heated to 135° C. Then, in the tenter, heat fixation was performed at 220° C. for 40 seconds. The film was relaxed by 1% in the transverse direction at 220° C., and then uniformly cooled slowly to room temperature to obtain a biaxially stretched film having a thickness of 200 μm.

7. Examples 7 to 9

A laminated body was produced in the same manner as in Example 1 except that the configuration of an easily adhesive layer was changed as shown in Table 4.

8. Evaluation

Using the laminated bodies of Examples 1 to 10 and Comparative Examples 1 to 8, peeling adhesive strength and a dropping time in a constant load immersion test were evaluated. The evaluation results are collectively shown in Table 4.
[Peeling Adhesive Strength]

Each of the laminated bodies of Examples 1 to 10 and Comparative Examples 1 to 8 was cut into a size of 10 mm×20 mm. A plate-shaped metal member selected according to the description of Table 4 was thermocompression-bonded to the adhesive resin layer on each of both surfaces of each of the obtained laminated bodies to prepare an assembly for fuel cell. This condition included a temperature of 160° C., a pressure of 3.0 MPa, and a pressure bonding time of 10 seconds. In the preparation of the assembly, by aligning one end portion of the laminated body in the longitudinal direction with one end portion of the metal member in the machine direction, and thermocompression-bonding the metal member to the laminated body, a portion to which the adhesive resin layer was not bonded was provided on the other end portion of the metal member in the longitudinal direction in the assembly. Then, the assembly was housed in an environment adjusted to 25° C. for 3 days to obtain a test piece.

Among the two metal members of the obtained test piece, a portion to which the adhesive resin layer was not bonded was fixed to each of upper and lower chucks, and peeling adhesive strength (N/10 mm) between the metal member and the adhesive resin layer was measured. The measurement condition included a temperature of 25° C. and a tensile speed of 30 mm/min.
[Dropping Time in Constant Load Immersion Test (Hot Water Resistance)]

In one metal member of a test piece prepared in the same procedure as in the peeling adhesive strength, a portion to which the adhesive resin layer was not bonded was suspended from above using a hook, and a weight was attached to a portion to which the adhesive resin layer was not bonded in the other metal member using a hook. A load was applied to the test piece using the weight so as to set a load to 0.4 N/mm in hot water. The test piece was immersed in hot water at 95° C. together with the weight, and a time until the bonded site was peeled off and the weight dropped was measured.

TABLE 4

| | | Example 1 | Example 2 | Example 3 | Example 4 | Example 5 | Example 6 | Example 7 | Example 8 | Example 9 | Example 10 |
|---|---|---|---|---|---|---|---|---|---|---|---|
| Resin substrate | Resin | PEN | PEN | PEN | PEN | PEN | PET | PEN | PEN | PEN | PEN |
| | Glass transition temperature (° C.) | 118 | 118 | 118 | 118 | 118 | 78 | 118 | 118 | 118 | 118 |

TABLE 4-continued

| | | | | | | | | | | | | |
|---|---|---|---|---|---|---|---|---|---|---|---|---|
| Easily adhesive layer | Resin | | Acrylic | Acrylic | Acrylic | Acrylic | Acrylic | Acrylic | Polyester | Acrylic | Acrylic | Acrylic |
| | Thickness (nm) | | 20 | 20 | 20 | 20 | 20 | 20 | 20 | 10 | 200 | 20 |
| Adhesive resin layer | Component (A) | A1 | 100 | — | — | — | — | 100 | 100 | 100 | 100 | — |
| | | A2 | — | 100 | 95 | 95 | 95 | — | — | — | — | 95 |
| | Component (B) | B1 | — | — | 5 | — | — | — | — | — | — | 5 |
| | | B2 | — | — | — | 5 | — | — | — | — | — | — |
| | | B3 | — | — | — | — | 5 | — | — | — | — | — |
| | PA | | — | — | — | — | — | — | — | — | — | — |
| | PES | | — | — | — | — | — | — | — | — | — | — |
| | PP | | — | — | — | — | — | — | — | — | — | — |
| | Acid value (mgKOH/g) | | 0.76 | 0.80 | 0.76 | 1.26 | 0.75 | 0.76 | 0.76 | 0.76 | 0.76 | 0.76 |
| | MFR (g/10 min) | | 8.2 | 9.1 | 10 | 12 | 8.5 | 8.2 | 8.2 | 8.2 | 8.2 | 10 |
| | Surface free energy $\gamma_A$ | | 30.6 | 26.7 | 40.7 | 22.1 | 35.4 | 30.6 | 30.6 | 30.6 | 30.6 | 40.7 |
| | Dispersion term $\gamma_A^D$ | | 27 | 26.2 | 30.3 | 20.8 | 30.1 | 27 | 27 | 27 | 27 | 30.3 |
| | Dipole term $\gamma_A^P$ | | 3.3 | 0.1 | 8.1 | 0.2 | 3.9 | 3.3 | 3.3 | 3.3 | 3.3 | 8.1 |
| | Hydrogen bond term $\gamma_A^H$ | | 0.3 | 0.4 | 2.3 | 1.1 | 1.4 | 0.3 | 0.3 | 0.3 | 0.3 | 2.3 |
| Metal member | Kind of adherend | | | | | | M1 | | | | | M5 |
| | Surface free energy $\gamma_M$ | | | | | | 47.1 | | | | | 51.6 |
| | Dispersion term $\gamma_M^D$ | | | | | | 45 | | | | | 47.8 |
| | Dipole term $\gamma_M^P$ | | | | | | 0.4 | | | | | 2.5 |
| | Hydrogen bond term $\gamma_M^H$ | | | | | | 1.7 | | | | | 1.1 |
| | Ratio of dipole term: $\gamma_M^P/\gamma_M \times 100$ (%) | | 0.85 | 0.85 | 0.85 | 0.85 | 0.85 | 0.85 | 0.85 | 0.85 | 0.85 | 4.8 |
| Characteristics | Difference in surface free energy between adherend and adhesive resin layer: $\gamma_M - \gamma_A$ (mN/m) | | 16.5 | 20.4 | 6.4 | 25 | 11.7 | 16.5 | 16.5 | 16.5 | 16.5 | 10.9 |
| | SP value (adhesive resin layer) | | 8.5 | 8.5 | 8.3 | 8.3 | 8.3 | 8.5 | 8.5 | 8.5 | 8.5 | 8.3 |
| | SP value (easily adhesive layer) | | 10.5 | 10.5 | 10.5 | 10.5 | 10.5 | 10.5 | 10.6 | 10.6 | 10.6 | 10.5 |
| | SP value (resin substrate) | | 12.9 | 12.9 | 12.9 | 12.9 | 10.7 | 12.9 | 12.9 | 12.9 | 12.9 | 12.9 |
| Evaluation | Peeling adhesive strength (N/10 mm) | | 25.0 | 28.0 | 27.0 | 35.0 | 28.0 | 25.0 | 25.0 | 25.0 | 25.0 | 27 |
| | Dropping time in constant load immersion test (hrs) | | 401 | 490 | 660 | 560 | 622 | 398 | 405 | 403 | 400 | 816 |

| | | | Comparative Example 1 | Comparative Example 2 | Comparative Example 3 | Comparative Example 4 | Comparative Example 5 | Comparative Example 6 | Comparative Example 7 | Comparative Example 8 |
|---|---|---|---|---|---|---|---|---|---|---|
| Resin substrate | Resin | | PEN | PEN | PEN | PEN | PEN | PEN | PEN | PEN |
| | Glass transition temperature (° C.) | | 118 | 118 | 118 | 118 | 118 | 118 | 118 | 118 |
| Easily adhesive layer | Resin | | Acrylic | Acrylic | Acrylic | Acrylic | Acrylic | Acrylic | Acrylic | Acrylic |
| | Thickness (nm) | | 20 | 20 | 20 | 20 | 20 | 20 | 20 | 20 |
| Adhesive resin layer | Component (A) | A1 | — | — | — | — | — | — | 100 | — |
| | | A2 | 100 | 95 | 95 | — | — | — | — | — |
| | Component (B) | B1 | — | 5 | 5 | — | — | — | — | — |
| | | B2 | — | — | — | — | — | — | — | — |
| | | B3 | — | — | — | — | — | — | — | — |
| | PA | | — | — | — | 100 | — | — | — | — |
| | PES | | — | — | — | — | 100 | 100 | — | — |
| | PP | | — | — | — | — | — | — | — | 100 |
| | Acid value (mgKOH/g) | | 0.80 | 0.76 | 0.76 | 7.0 | 0.8 | 0.8 | 0.76 | 10.3 |
| | MFR (g/10 min) | | 9.1 | 10 | 10 | 6.0 | 60 | 60 | 8.2 | 22 |
| | Surface free energy $\gamma_A$ | | 26.7 | 40.7 | 40.7 | 43 | 46.3 | 46.3 | 30.6 | 37.3 |
| | Dispersion term $\gamma_A^D$ | | 26.2 | 30.3 | 30.3 | 40.2 | 36.3 | 36.3 | 27 | 29.3 |
| | Dipole term $\gamma_A^P$ | | 0.1 | 8.1 | 8.1 | 1.9 | 8.7 | 8.7 | 3.3 | 4.4 |
| | Hydrogen bond term $\gamma_A^H$ | | 0.4 | 2.3 | 2.3 | 0.3 | 1.3 | 1.3 | 0.3 | 3.6 |
| Metal member | Kind of adherend | | | M2 | M3 | M1 | M2 | M4 | M4 | M1 |
| | Surface free energy $\gamma_M$ | | | 49.7 | 50.9 | 47.1 | 49.7 | 45 | 45 | 47.1 |
| | Dispersion term $\gamma_M^D$ | | | 43 | 43 | 45 | 43 | 45 | 45 | 45 |
| | Dipole term $\gamma_M^P$ | | | 3.2 | 5.6 | 0.4 | 3.2 | 0 | 0 | 0.4 |
| | Hydrogen bond term $\gamma_M^H$ | | | 3.5 | 2.3 | 1.7 | 3.5 | 0 | 0 | 1.7 |
| | Ratio of dipole term: $\gamma_M^P/\gamma_M \times 100$ (%) | | | 6.4 | 11 | 0.85 | 6.4 | 0 | 0 | 0.85 |

TABLE 4-continued

| Characteristics | Difference in surface free energy between adherend and adhesive resin layer: $\gamma_M - \gamma_A$ (mN/m) | 23 | 9 | 10.2 | 4.1 | 3.4 | −1.3 | 14.4 | 9.8 |
|---|---|---|---|---|---|---|---|---|---|
| | SP value (adhesive resin layer) | 8.5 | 8.3 | 8.5 | 13.6 | 10 | 10 | 8.5 | 11.0 |
| | SP value (easily) adhesive layer) | 10.5 | 10.5 | 10.5 | 10.5 | 10.5 | 10.5 | 10.5 | 10.5 |
| | SP value (resin substrate) | 12.9 | 12.9 | 12.9 | 12.9 | 12.9 | 12.9 | 12.9 | 12.9 |
| Evaluation | Peeling adhesive strength (N/10 mm) | 28.0 | 26.0 | 26.0 | 40.0 | 28.0 | 28.0 | 25 | 40 |
| | Dropping time in constant load immersion test (hrs) | 20 | 38 | 35 | 4 | 8 | 5 | 69 | 3 |

From Table 4, the assemblies for fuel cell formed by using the laminated bodies of Examples 1 to 10 were found to have more excellent hot water resistance than that of the assemblies for fuel cell formed by using the laminated bodies of Comparative Examples 1 to 8.

INDUSTRIAL APPLICABILITY

The assembly for fuel cell and the laminated body of the present disclosure can be suitably used as a member of a fuel cell in the field of an on-vehicle battery and the like.

The invention claimed is:

1. An assembly for fuel cell comprising:
an adhesive resin layer containing a polyolefin having at least one group selected from the group consisting of an acidic group and an acid anhydride group and having an acid value of 0.01 mgKOH/g to 6.5 mgKOH/g; and
two or more members bonded with the adhesive resin layer interposed therebetween,
wherein at least one of the members is a metal member having a ratio of a dipole term in surface free energy of 0.01% to 5.0%, and
wherein a relationship between the surface free energy $\gamma_M$ of the metal member and surface free energy $\gamma_A$ of the adhesive resin layer satisfies $\gamma_M - \gamma_A \geq 5.0$ mN/m.

2. An assembly for fuel cell comprising:
a laminated body including a resin substrate, an easily adhesive layer provided on at least one surface of the resin substrate, and an adhesive resin layer provided on a surface of the easily adhesive layer on a side opposite to the resin substrate, and containing a polyolefin having at least one group selected from the group consisting of an acidic group and an acid anhydride group and having an acid value of 0.01 mgKOH/g to 6.5 mgKOH/g; and
a metal member bonded to at least a part of a surface of the adhesive resin layer of the laminated body and having a ratio of a dipole term in surface free energy of 0.01% to 5.0%,
wherein a relationship between the surface free energy $\gamma_M$ of the metal member and surface free energy $\gamma_A$ of the adhesive resin layer satisfies $\gamma_M - \gamma_A \geq 5.0$ mN/m.

3. The assembly for fuel cell according to claim 2, wherein
a solubility parameter of the easily adhesive layer is larger than a solubility parameter of the adhesive resin layer and smaller than a solubility parameter of the resin substrate, and
an absolute value of a difference between the solubility parameter of the easily adhesive layer and the solubility parameter of the adhesive resin layer is 3.0 $(J/cm^3)^{1/2}$ or less.

4. The assembly for fuel cell according to claim 2, wherein the easily adhesive layer has a thickness of 8 nm to 200 nm.

5. The assembly for fuel cell according to claim 2, wherein the resin substrate has a glass transition temperature of 90° C. or higher.

6. The assembly for fuel cell according to claim 2, wherein the laminated body includes the easily adhesive layer provided on each of both surfaces of the resin substrate, and the adhesive resin layer provided on each of surfaces of the easily adhesive layer on a side opposite to the resin substrate.

7. The assembly for fuel cell according to claim 1, wherein
the acidic group contains a carboxylic acid group, and
the acid anhydride group contains a carboxylic acid anhydride group.

8. The assembly for fuel cell according to claim 1, wherein
the polyolefin contains a propylene unit, and
a content of the propylene unit is 50% by mass or more with respect to the polyolefin.

9. The assembly for fuel cell according to claim 1, wherein the polyolefin has an acid value of 0.01 mgKOH/g to 3.0 mgKOH/g.

10. The assembly for fuel cell according to claim 1, wherein the adhesive resin layer further contains a styrene-based thermoplastic elastomer.

11. The assembly for fuel cell according to claim 10, wherein a content of the styrene-based thermoplastic elastomer is 20% by mass or less with respect to a total amount of the polyolefin and the styrene-based thermoplastic elastomer.

12. The assembly for fuel cell according to claim 1, wherein the adhesive resin layer has an acid value of 0.01 mgKOH/g to 6.5 mgKOH/g.

13. The assembly for fuel cell according to claim 1, wherein the metal member is titanium or a titanium alloy.

14. A bonding method comprising bonding (a) a laminated body including a resin substrate, an easily adhesive layer provided on at least one surface of the resin substrate, and an adhesive resin layer provided on a surface of the easily adhesive layer on a side opposite to the resin substrate, and containing a polyolefin having at least one group selected from the group consisting of an acidic group and an acid anhydride group and having an acid value of 0.01 mgKOH/g to 6.5 mgKOH/g to (b) a metal member of a fuel cell in a state where the metal member faces the adhesive resin layer of the laminated body, wherein the metal member has a ratio of a dipole term in surface free energy of 0.01% to 5.0%, and wherein a relationship between the surface free energy $\gamma_M$ of the metal member and surface free energy $\gamma_A$ of the adhesive resin layer satisfies $\gamma_M - \gamma_A \geq 5.0$ mN/m.

15. The assembly for fuel cell according to claim 1, wherein the metal member is titanium, titanium alloy, or iron alloy.

16. The assembly for fuel cell according to claim 2, wherein the metal member is titanium.

17. The assembly for fuel cell according to claim 2, wherein the metal member is titanium alloy.

18. The assembly for fuel cell according to claim 2, wherein the metal member is titanium, titanium alloy, or iron alloy.

19. The assembly for fuel cell according to claim 1, wherein a melt flow rate of the polyolefin is 0.1 g/10 min to 30 g/10 min under measurement conditions of 230° C. and a test pressure of 1.96 MPa.

20. The assembly for fuel cell according to claim 2, wherein a melt flow rate of the polyolefin is 0.1 g/10 min to 30 g/10 min under measurement conditions of 230° C. and a test pressure of 1.96 MPa.

* * * * *